(12) United States Patent
Schmidt

(10) Patent No.: US 8,521,118 B2
(45) Date of Patent: Aug. 27, 2013

(54) CIRCUIT ARRANGEMENT WITH RADIO-FREQUENCY MIXER, AND RECEIVER ARRANGEMENT WITH THE CIRCUIT ARRANGEMENT

(75) Inventor: Axel Schmidt, Wunstorf (DE)

(73) Assignee: Intel Mobile Communications GmbH, Neubiberg (DE)

( * ) Notice: Subject to any disclaimer, the term of this patent is extended or adjusted under 35 U.S.C. 154(b) by 395 days.

(21) Appl. No.: 12/852,445

(22) Filed: Aug. 6, 2010

(65) Prior Publication Data

US 2010/0323649 A1 Dec. 23, 2010

Related U.S. Application Data

(60) Division of application No. 11/067,834, filed on Feb. 28, 2005, now Pat. No. 7,787,851, which is a continuation of application No. PCT/DE03/02639, filed on Aug. 6, 2003.

(30) Foreign Application Priority Data

Aug. 29, 2002 (DE) .................................. 102 39 855

(51) Int. Cl.
*H04B 1/10* (2006.01)
(52) U.S. Cl.
USPC .......................... 455/303; 455/552.1; 455/311

(58) Field of Classification Search
USPC ................... 455/183.1, 266, 256, 307, 192.1, 455/552.1, 303, 311
See application file for complete search history.

(56) References Cited

U.S. PATENT DOCUMENTS

| 4,133,040 | A | * | 1/1979 | Hampel | 708/675 |
| 6,961,368 | B2 | * | 11/2005 | Dent et al. | 375/219 |
| 2002/0151287 | A1 | * | 10/2002 | Lindquist et al. | 455/183.1 |

OTHER PUBLICATIONS

Prosecution History from U.S. Appl. No. 11/067,834, filed Feb. 28, 2005, to include: Apr. 28, 2010 Notice of Allowance and Fees Due (PTOL-85); Nov. 16, 2009 Final Rejection; Nov. 16, 2009; Non-Final Rejection May 1, 2009; Final Rejection Apr. 4, 2008; Non-Final Rejection Apr. 4, 2008; and Feb. 28, 2005 Information Disclosure Statement (IDS) Filed (SB/08).

* cited by examiner

*Primary Examiner* — Christian Hannon
(74) *Attorney, Agent, or Firm* — SpryIP, LLC

(57) ABSTRACT

A circuit arrangement is disclosed with a radio-frequency mixer in which a plurality of preamplifiers in a receiver have a common output node. This node is connected to a common, broadband radio-frequency mixer via common coupling capacitances. Switching means can be used to connect and disconnect the preamplifiers, which can be associated with various frequency bands, independently of one another. The present principle can be applied in multiband receivers in mobile radio and allows integration using little chip area with good radio-frequency characteristics.

12 Claims, 2 Drawing Sheets

CIRCUIT ARRANGEMENT WITH RADIO-FREQUENCY MIXER, AND RECEIVER ARRANGEMENT WITH THE CIRCUIT ARRANGEMENT

RELATED APPLICATIONS

This Application is a Divisional Application of co-pending U.S. patent application Ser. No. 11/067,834, which was filed on Feb. 28, 2005. The co-pending application is a Continuation of PCT/DE03/02639, which was not published in English, which claims the benefit of the priority date of German Patent Application No. DE 102 39 855.0, filed on Aug. 29, 2002. The contents of the foregoing three previously file applications are herein incorporated by reference in their entireties. Additionally, this Divisional claims the priority benefit of the three previously file applications.

BACKGROUND

Particularly in mobile radio, there is the trend toward "multiband" receivers, which are designed to receive radio signals on different frequency bands. In Germany, for example, there are two different frequency bands for the GSM (Global System for Mobile communication) mobile radio standard, namely 900 MHz and 1 800 MHz. While the "D networks" operate in the frequency range around 900 MHz, the "E networks" have an associated frequency range around 1 800 MHz. Mobile radios which can send and receive on both frequency levels are called dual-band appliances.

In order to allow mobile radios to be used worldwide within the context of the globalization of the markets and the high level of user mobility, it is desirable for just one appliance to be provided with access not just to the frequency ranges around 900 and 1 800 MHz but also to other frequency ranges, such as GSM 1 900 and GSM 800, as are used in the USA, for example.

In the reception signal paths of such mobile radio receivers, there is now the problem of designing channel filters, amplifiers etc. to be suitable for these various frequency bands. Multiband receivers are normally designed such that a separate reception path is provided for each reception band. This reception path comprises not only a channel filter but also a specially adapted low noise preamplifier, and also a separate down-conversion frequency mixer.

The documents WO 02/27953, U.S. Pat. No. 6,029,052 and U.S. Pat. No. 6,405,025 each describe different embodiments of receivers. Each receiver contains a plurality of parallel receiver paths with a respective low noise amplifier. The outputs of the amplifiers, which are isolated from one another, are coupled to a jointly used radio-frequency mixer. Each amplifier is designed to amplify a signal predetermined by a mobile radio standard.

A drawback of such a receiver architecture is the relatively high component complexity and the associated area involvement for integrating such circuits.

SUMMARY

The detailed description is described with reference to the accompanying figures. In the figures, the left-most digit(s) of a reference number identifies the figure in which the reference number first appears. The use of the same reference number in different instances in the description and the figures may indicate similar or identical items.

The present invention includes a circuit arrangement with a radio-frequency mixer and also a receiver arrangement that includes this circuit arrangement. The circuit arrangement and the receiver can be integrated on a smaller area and nevertheless has good radio-frequency properties.

In accordance with an aspect of the present invention, a circuit arrangement with a radio-frequency mixer is provided. The circuit arrangement, having:
the radio-frequency mixer with a first input, with a second input and with an output,
a first preamplifier with an input and with an output, which is coupled to the first input of the radio-frequency mixer,
a means for turning on and off the first preamplifier, which means is coupled to the first preamplifier,
a second preamplifier with an output, which is connected to the output of the first preamplifier to form a common output node, and
a means for turning on and off the second preamplifier, which means is coupled to the second preamplifier.

In line with the present principle, a common radio-frequency mixer can be used which is actuated by different reception paths designed for various frequency bands. This can reduce the chip area requirement of a multiband receiver based on a circuit arrangement of this type. The preamplifiers in the present circuit arrangement have a common output which is coupled to the common radio-frequency mixer.

It is in line with the present principle for it to be possible to dispense with providing multiband receivers with a separate radio-frequency mixer for each reception path for the purpose of useful signal processing.

The common output node of the preamplifiers is coupled to the radio-frequency mixer, such as via a coupling capacitance.

The common output node and the common radio-frequency mixer also significantly reduce the capacitive load on the respective preamplifier which is turned on, which improves the radio-frequency characteristics.

The means for turning on and off the preamplifiers advantageously allow these preamplifiers to be turned on and off independently of one another and according to the desired reception band.

The input transistors in the preamplifiers can each be connected up as diodes which can be turned on and off.

The preamplifiers can have not only a common output node but also a common electrical load, which may be in the form of a current source connected to supply potential.

In another aspect of the invention, the first and second preamplifiers may have been adapted to suit the special requirements of the respective frequency band for which they are intended to be used.

The radio-frequency mixer is optionally in the form of a broadband mixer.

The preamplifiers are can be in the form of low noise preamplifiers, referred to as LNAs (Low Noise Amplifier).

It is naturally within the scope of the invention for the present principle to be applied to arrangements containing three or more preamplifiers. In this case, all of the preamplifiers have a common output node. Typically, each preamplifier is associated with one frequency band and/or with one modulation method.

In accordance with another aspect of the present invention, a receiver arrangement comprising the circuit arrangement of above is disclosed and comprises:
a means for inputting a radio-frequency signal,
a first reception path having a first bandpass filter with an input, which is coupled to the means for inputting a radio-frequency signal, and with an output and also having the first preamplifier, whose input is coupled to the output of the first bandpass filter, and a second reception path having a second bandpass filter with an input, which is coupled to the means for inputting a radio-frequency signal, and with an output and also having the second preamplifier, whose input is coupled to the output of the second bandpass filter.

In line with the proposed principle, a dual-band receiver or multiband receiver contains two reception paths whose inputs can be coupled to a common antenna or to a respective associated, separate antenna. Instead of the antenna, it is also possible to provide another means for inputting a radio-frequency signal.

The reception paths each have a preamplifier, and the two preamplifiers have a common output node. The common output node is again coupled to a common down-conversion frequency mixer.

In addition to the advantages which have already been explained, implementing the circuit arrangement with a radio-frequency mixer based on the present principle in a receiver arrangement has the advantage that the two reception paths can be adapted, for example in terms of the bandpass filters, to suit the respective associated frequency band exactly and with a high level of selectivity.

Similarly, the preamplifiers which are connected downstream of the bandpass filters may also be adapted to suit the respective associated reception band and may accordingly be in different forms. Despite this advantageous adaptability of the components which are crucial for channel selection, the present principle can nevertheless be used to save a significant amount of chip area by virtue of a common down-conversion frequency mixer being used.

Since further coupling capacitances associated with each preamplifier can be dispensed with in the case of the described, preferred coupling of the common output node to the mixer input via a coupling capacitance, an additional improvement in the radio-frequency characteristics of the dual-band receiver is obtained.

In line with another aspect, a control device is provided which can use the means for turning on and off the preamplifiers to connect and disconnect said preamplifiers independently of one another. Of the plurality of preamplifiers, no more than one is on at the same time. This achieves a further noise improvement, and also reduces the power consumption of the receiver as a whole.

It is within the scope of the invention for both the circuit arrangement with a radio-frequency mixer and the receiver arrangement with the circuit arrangement to be developed by providing third, fourth or even more preamplifiers which are each designed to be able to be connected and disconnected independently of one another. This allows the dual-band receiver to be easily developed as a triband receiver or generally as a multiband receiver.

Further details and refinements of the present invention are disclosed.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different instances in the description and the figures may indicate similar or identical items.

DETAILED DESCRIPTION

Figure 1:
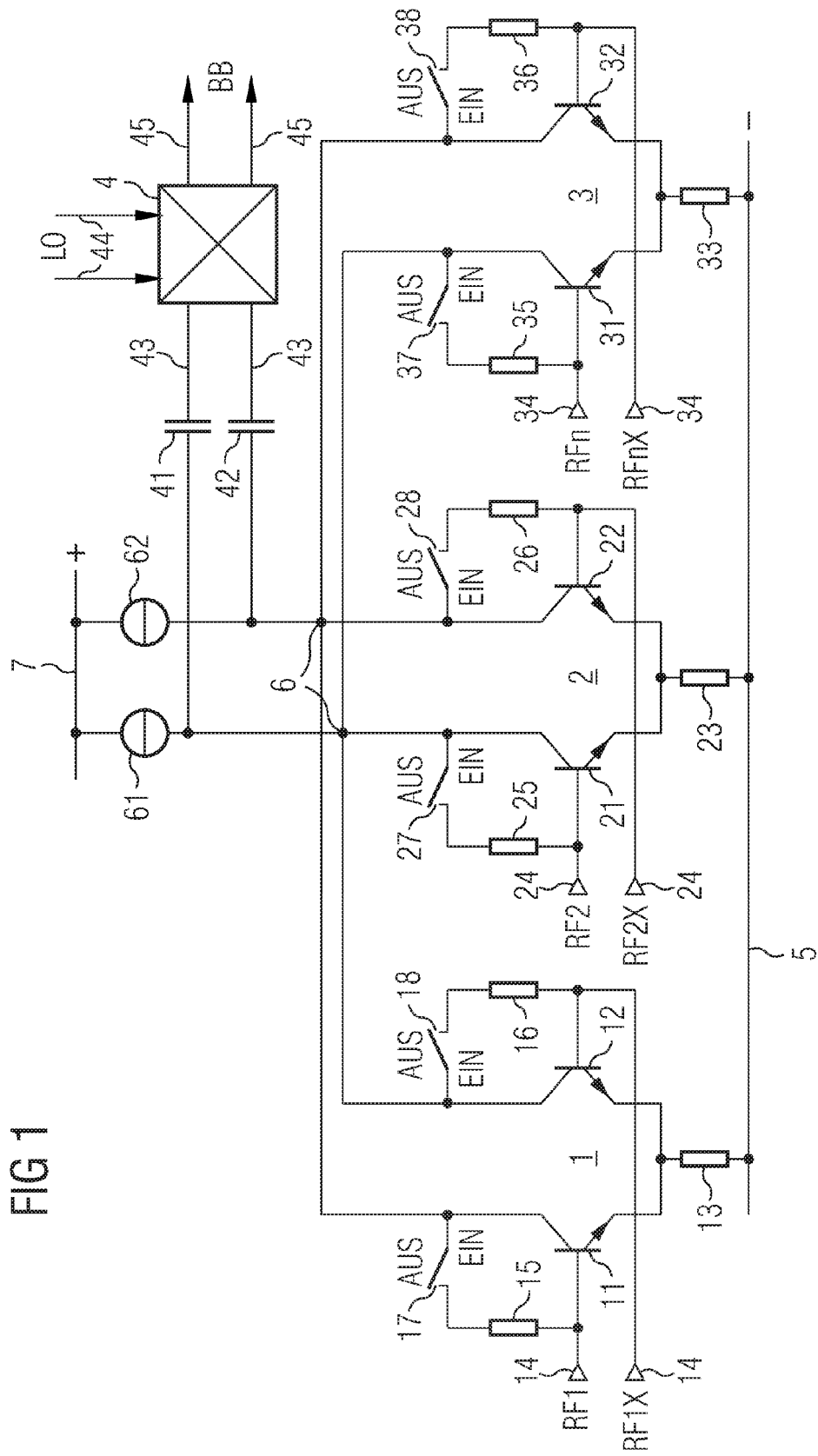
FIG. 1 shows an exemplary embodiment of a circuit arrangement with a radio-frequency mixer based on the present principle, to which three preamplifiers are connected at the input.

The present invention will now be described with reference to the drawings wherein like reference numerals are used to refer to like elements throughout. The illustrations and following descriptions are exemplary in nature, and not limiting. Thus, it will be appreciated that variants of the illustrated systems and methods and other such implementations apart from those illustrated herein are deemed as falling within the scope of the present invention and the appended claims.

FIG. 1 shows three preamplifiers 1 to 3 with a common output node 6 to which a common, broadband radio-frequency mixer 4 is connected.

The first, second and third preamplifiers 1 to 3 are in the form of low noise preamplifiers (LNA) and are each designed using balanced circuitry. Each preamplifier 1 to 3 comprises two emitter-coupled NPN bipolar transistors 11, 12; 21, 22; 31, 32. The common emitter node of the amplifier transistors 11, 12; 21, 22; 31, 32 connected to one another in pairs is connected to a common reference potential connection 5 via a respective resistor 13, 23, 33. Each preamplifier 1, 2, 3 has a separate radio-frequency input 14, 24, 34, with two respective input terminals, a respective one of which is connected to a respective associated base connection of an amplifier transistor 11, 12; 21, 22; 31, 32. The radio-frequency inputs 14, 24, 34 can be supplied with a respective differential signal RF1, RF1X; RF2, RF2X; RFn, RFnX. These inputs 14, 24, 34 can have respective reception signal paths of a radio receiver connected to them, which are designed for different frequency bands or modulation methods. The collector connections of the transistors 11, 12; 21, 22; 31, 32 are connected to one another in respective pairs at a common output node 6, that is to say that the collector connections of the transistors 11, 21, 31 are connected to one another at one node and the collector connections of the transistors 12, 22, 32 are connected to one another at a further circuit node which, together with the first node, forms the balanced output node 6 of the preamplifiers 1 to 3.

In order to turn on and off the preamplifiers 1 to 3 independently of one another, a respective path is provided between the base connection and the collector connection of the transistors 11, 12; 21, 22; 31, 32, which path respectively comprises a series circuit comprising a resistor 15, 16, 25, 26, 35, 36 and a switch 17, 18, 27, 28, 37, 38. The two switches 17, 18; 27, 28; 37, 38 associated with a preamplifier 1, 2, 3 are turned on and off together in respective pairs. When the switches are in the open state, the respectively associated preamplifier 1, 2, 3 is off. In order to turn on one of the preamplifiers 1 to 3, the switch pair 17, 18; 27, 28; 37, 38 associated with it is closed. The two other switch pairs remain open. The balanced output node 6, which is common to all of the preamplifiers 1 to 3, is connected to a supply potential connection 7 via a respective current source 61, 62 which is common to all of the preamplifiers.

In addition, the balanced output 6 is connected to the first input 43 of the radio-frequency mixer 4, which input is designed for differential signal transmission, via a respective series capacitor 41, 42. A second input 44 of the radio-frequency mixer 4 is designed to supply a local oscillator signal containing signal components which have been phase-shifted through 90° with respect to one another. At the output of the mixer 4, which is provided with reference symbol 45 and is likewise of balanced design, it is possible to tap off a baseband signal BB or an intermediate-frequency signal, depending on the architecture of the receiver.

In the present circuit arrangement, the preamplifiers 1 to 3, which are each associated with different reception paths, have a common output 6 which is connected to the associated mixer 4. There are thus advantageously just two coupling capacitances 41, 42 per mixer input 43. This in turn means that there is a particularly small capacitive load at the output of the respective active low noise preamplifier 1 to 3. The circuit therefore has improved radio-frequency characteristics.

To be able to turn on and off the preamplifiers 1 to 3 independently of one another, the input transistors 11, 12, 21, 22, 31, 32 are connected up as switchable diodes.

The circuit arrangement from FIG. 1 may advantageously be used in a triband receiver, for example. A triband receiver of this type may be used to process the mobile radio standards GSM 900, GSM 1 800 and GSM 1 900, for example or other frequency ranges.

The principle described may naturally also be applied when there are just two preamplifiers or may alternately be extended to any number of preamplifiers and reception paths.

In alternative embodiments, it is also possible for current sources to be provided instead of the resistors 13, 23, 33.

Instead of the current sources 61, 62, any other, even complex, electrical loads may be provided in alternative embodiments.

Between the collector connections of the differential amplifier transistors and the common output node 6 there may be a respective cascade transistor. This achieves a further increase in insulation.

In alternative embodiments, an additional amplifier stage may be added between the low noise preamplifiers 1, 2, 3 and the mixer 4.

Figure 2:
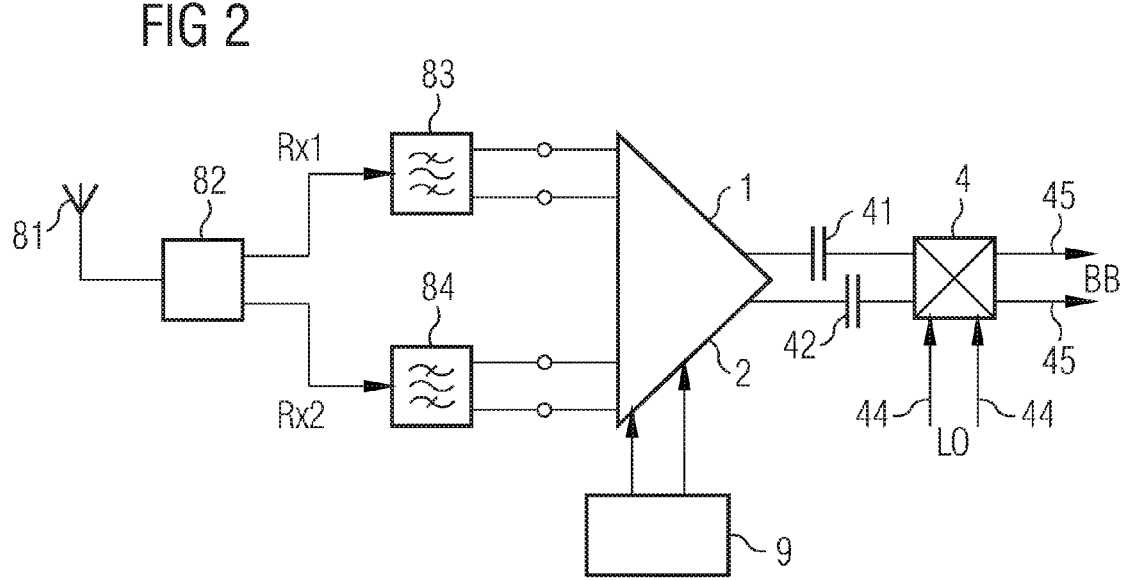
FIG. 2 shows an exemplary dual-band receiver with the connection of preamplifiers and radio-frequency mixers in two reception paths.

FIG. 2 shows, by way of example, the application of the principle from FIG. 1 in a dual-band receiver with two reception paths RX1, RX2. In that case, an antenna 81 has a coupling element 82 connected to it, with a first output, which is connected to a first surface acoustic wave filter 83, and a second output, which is connected to a second surface acoustic wave filter 84. The surface acoustic wave filters 83, 84 are used to select the respective frequency band associated with the reception path RX1, RX2 and to suppress unwanted frequency components. At the outputs of the filters 83, 84, there is a respective preamplifier 1, 2, such as the preamplifiers shown and connected to one another in FIG. 1. If the preamplifiers of FIG. 1 are employed, the switches 17, 18; 27, 28 1, 2 have their control inputs connected to an actuation circuit 9, which activates the respective desired preamplifier. The outputs of the preamplifiers 1, 2 are connected via coupling capacitances 41, 42 to a first input of the radio-frequency mixer 4, which is in the form of a down-conversion mixer. The second input 44 is used to supply a local oscillator signal LO. At the output 45, it is possible to tap off a baseband signal BB.

The preamplifiers 1, 2 can employ different frequency ranges and/or modulation methods. For example, the preamplifiers 1,2 can employ frequency ranges such as, about 800 to 900 MHz, about 880 to 960 Mhz, about 1700 to 1900 Mhz, about 1850 to 2000 Mhz, and the like. As another example, the preamplifiers 1,2 can employ frequency ranges for different communication standards such as GSM 900, GSM 1800, GSM 1900, GSM 800, and the like. It is noted that the present invention is not limited to a specific group or range of frequencies.

The chip area saving which is possible with the present principle is clear to see. In the illustration in FIG. 2, just one common down-conversion frequency mixer 4 is required, despite the option of being able to process various frequency bands. The common output node 6 of the preamplifiers 1, 2 means that the capacitive load governed by the coupling capacitances 41, 42 is also relatively small.

It goes without saying that it is within the scope of the invention to apply the principle shown also to receivers with more than two frequency bands, for example to triband receivers.

Instead of the circuit implementation shown in FIG. 1 using differential, bipolar circuitry, it is also possible to implement it using "single-ended circuitry" and/or using CMOS circuitry within the scope of the invention.

Although the invention has been illustrated and described above with respect to a certain aspects and implementations, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (i.e., that is functionally equivalent), even though not structurally equivalent to the disclosed structure, which performs the function in the herein illustrated exemplary implementations of the invention. In this regard, it will also be recognized that the invention may include a computer-readable medium having computer-executable instructions for performing the steps of the various methods of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "includes", "including", "has", "having", "with" and variants thereof are used in either the detailed description or the claims, these terms are intended to be inclusive in a manner similar to the term "comprising". Also, the term "exemplary" as utilized herein simply means example, rather than finest performer.

For the purposes of this disclosure and the claims that follow, the terms "coupled" and "connected" have been used to describe how various elements interface. Such described interfacing of various elements may be either direct or indirect. Although the subject matter has been described in language specific to structural features and/or methodological acts, it is to be understood that the subject matter defined in the appended claims is not necessarily limited to the specific features or acts described. Rather, the specific features and acts are disclosed as preferred forms of implementing the claims. The specific features and acts described in this disclosure and variations of these specific features and acts may be implemented separately or may be combined.

The invention claimed is:

1. A receiver arrangement comprising:
an antenna that receives a radio-frequency signal;
a first reception path comprising:
   a first bandpass filter with an input coupled to the antenna and an output; and
   a first preamplifier having an input coupled to the output of the first bandpass filter; and
a second reception path comprising:
   a second bandpass filter with an input coupled to the antenna and an output;
   a second preamplifier having an input coupled to the output of the second bandpass filter; and a switch to turn on and to turn off the second preamplifier, wherein the second preamplifier comprises a common-emitter transistor, the common-emitter transistor including a base connection coupled to the input of the second preamplifier, a collector connection coupled to a common output node associated with the first and second preamplifiers, and an emitter connection coupled to a reference potential, and wherein the switch includes a first connection coupled to the base connection and a second connection coupled to the collector connection.

2. The arrangement of claim 1, further comprising a control device having a first output coupled to the first preamplifer that turns the first preamplifier on and off and a second output coupled to the second preamplifier that turns the second preamplifier on and off.

3. The arrangement of claim 1, wherein the common output node is connected to an output of the first preamplifier and an output of the second preamplifier.

4. The arrangement of claim 3, further comprising a frequency mixer having an input connected to the common output node.

5. The arrangement of claim 1, further comprising at least one additional reception path each having an additional bandpass filter with an input coupled to the antenna and an output, and an additional preamplifier having an input connected to the output of the additional bandpass filter.

6. A circuit arrangement with a radio-frequency mixer comprising:

the radio-frequency mixer having a first input, a second input, and an output;

a first preamplifier having an input and an output operable at a first frequency range, and further having a switch to turn on and to turn off the first preamplifier;

a second preamplifier having an input and an output operable at a second frequency range, wherein the output is connected to the output at a common output node;

wherein the common output node is coupled to the first input of the radio-frequency mixer and also receives a supply voltage, wherein the first preamplifier comprises a common-emitter transistor, the common-emitter transistor including a base connection coupled to the input of the first preamplifier, a collector connection coupled to the common output node, and an emitter connection coupled to a reference potential, and wherein the switch includes a first connection coupled to the base connection and a second connection coupled to the collector connection.

7. The circuit arrangement of claim 6, further comprising a third preamplifier having an input and an output operable for a third frequency range, wherein the output is connected to the common output node.

8. The circuit arrangement of claim 7, further comprising a fourth preamplifier having an input and an output operable for a fourth frequency range, wherein the output is connected to the common output node.

9. The circuit arrangement of claim 8, wherein the first frequency range is about 800 to 900 MHz, the second frequency range is about 880 to 960 Mhz, the third frequency range is about 1700 to 1900 Mhz, the fourth frequency range is about 1850 to 2000 Mhz.

10. The circuit arrangement of claim 6, wherein the common output node is further coupled to the first preamplifier.

11. A receiver arrangement comprising:

an antenna that receives a radio-frequency signal;

a first reception path comprising:

a first bandpass filter with an input coupled to the antenna and an output; and a first preamplifier having an input coupled to the output of the first bandpass filter; and a second reception path comprising:

a second bandpass filter with an input coupled to the antenna and an output;

a second preamplifier having an input coupled to the output of the second bandpass filter; and a switch to turn on and to turn off the second preamplifier, wherein the second preamplifier comprises a common-emitter transistor, and the switch includes a first connection coupled to a base connection of the common-emitter transistor and a second connection coupled to a collector connection of the common-emitter transistor.

12. A circuit arrangement with a radio-frequency mixer comprising:

the radio-frequency mixer having a first input, a second input, and an output;

a first preamplifier having an input and an output operable at a first frequency range, and further having a switch to turn on and to turn off the first preamplifier;

a second preamplifier having an input and an output operable at a second frequency range, wherein the output is connected to the output at a common output node;

wherein the common output node is coupled to the first input of the radio-frequency mixer and also receives a supply voltage, wherein the first preamplifier comprises a common-emitter transistor, and the switch includes a first connection coupled to a base connection of the common-emitter transistor and a second connection coupled to a collector connection of the common-emitter transistor.

* * * * *